(12) United States Patent
Vannucci et al.

(10) Patent No.: US 6,518,918 B1
(45) Date of Patent: Feb. 11, 2003

(54) WIRELESS ASSISTED ALTITUDE MEASUREMENT

(75) Inventors: Giovanni Vannucci, Township of Middletown, Monmouth County, NJ (US); Peter Wasily Wolniansky, Ocean Grove, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/568,957

(22) Filed: May 11, 2000

(51) Int. Cl.[7] .............................................. H04B 7/185
(52) U.S. Cl. ............................. 342/357.06; 342/357.11; 342/462; 342/125; 342/174; 701/207; 701/213; 137/81.1; 733/179
(58) Field of Search ................................ 701/200, 207, 701/213, 215; 342/357.06, 357.07, 357.11, 357.12, 462, 120, 123, 125, 145, 165, 173, 174, 357.01, 357.02, 357.1; 137/78.1, 81.1, 78.5; 73/178 R; 340/977, 174, 970, 979

(56) References Cited

U.S. PATENT DOCUMENTS

| | | | | |
|---|---|---|---|---|
| 4,584,646 A | * | 4/1986 | Chan et al. ................... 701/207 |
| 4,977,509 A | * | 12/1990 | Pitchford et al. ............ 701/207 |
| 5,178,010 A | * | 1/1993 | Holzel .......................... 73/384 |
| 5,191,792 A | * | 3/1993 | Gloor ........................ 73/178 R |
| 5,210,540 A | * | 5/1993 | Masumoto ............. 342/357.11 |
| 5,402,116 A | * | 3/1995 | Ashley ..................... 340/870.1 |
| 5,646,857 A | * | 7/1997 | McBurney et al. ......... 701/213 |
| 5,940,035 A | * | 8/1999 | Hedrick ....................... 342/462 |
| 5,966,229 A | * | 10/1999 | Dodley et al. .............. 359/187 |
| 6,055,455 A | | 4/2000 | McBurney et al. ......... 701/207 |
| 6,055,477 A | * | 4/2000 | McBurney et al. ......... 701/207 |

FOREIGN PATENT DOCUMENTS

| | | | |
|---|---|---|---|
| DK | 195 01 879 A1 | 1/1995 | ........... G01C/21/00 |
| EP | WO 98/43045 | 3/1997 | ........... G01C/21/00 |
| EP | WO 00/58744 | 3/2000 | ............. G01S/1/02 |

* cited by examiner

Primary Examiner—Jacques H. Louis-Jacques
(74) Attorney, Agent, or Firm—Jimmy Goo; Harness, Dickey & Pierce, P.L.C.

(57) ABSTRACT

Disclosed is a communication device and method for estimating a more accurate vertical position or altitude of a communication device using atmospheric pressure measurements. In one embodiment, a first communication device comprises a pressure sensor for measuring local atmospheric pressure at the first communication device and a transceiver for communicating with a second communication device, wherein the transceiver may be operable to receive barometric calibration information for calibrating a local atmospheric pressure measured at the first communication device and/or to transmit the measured local atmospheric pressure to the second communication device. The first communication device may further comprise a processor for estimating an altitude using the measured local atmospheric pressure and received barometric calibration information.

22 Claims, 2 Drawing Sheets

WIRELESS ASSISTED ALTITUDE MEASUREMENT

FIELD OF THE INVENTION

The present invention relates generally to communication systems and, in particular, to geo-location of communication devices.

BACKGROUND OF THE RELATED ART

The idea of geo-location of wireless communication devices, such as mobile telephones, is well known. Current geo-location techniques for wireless communication devices involve employment of the well-known Global Positioning Satellite (GPS) system and/or network-based solutions, such as forward and/or reverse link triangulation techniques. See FIG. 1, which illustrates an architecture for locating mobile-telephone 16 using a plurality of GPS satellites 12 comprising the GPS system and/or a plurality of base stations 14 used in network-based solutions. Note that the term GPS shall include the Global Positioning Satellite system and other geo-location satellite systems.

One drawback with either of the aforementioned geo-location techniques is that altitude estimates are inherently inaccurate. The reason for this inherent inaccuracy is, simply, geometry. Specifically, most of the sources/receivers, i.e., base stations and satellites, tend to be in or near the horizontal plane. To obtain an accurate altitude estimate, one or more (preferably several) sources/receivers should be nearly overhead. Note that a base station or satellite is considered to be in or near the horizontal plane if it is not more than 45° above the horizon, as shown in FIG. 1. For network-based solutions, all of the base stations 14 are in the horizontal plane of the local ground level allowing for location fixes in the horizontal position but not in the vertical position. For GPS systems, although one or more GPS satellites 12 may be overhead, most of GPS satellites 12 are near the horizontal plane. Thus, location fixes employing GPS systems are substantially less accurate in the vertical position than in the horizontal position. Furthermore, if fewer than four GPS satellites are visible, determining the vertical position of the receiver is generally impossible, regardless of the satellites' position in the sky.

Unfortunately, accuracy in determining the location of a mobile-telephone in the vertical position is more desirable than for the horizontal position. For example, if a crime is reported and a set of coordinates (longitude, latitude and altitude) is provided to the police, a horizontal (longitude and latitude) error of tens of meters is largely inconsequential whereas a vertical (altitude) error of tens of meters would lead the police to a wrong floor of a building. Even under optimal conditions, the vertical accuracy of differential GPS receivers, which are currently the best available GPS receivers for determining location using GPS satellite signals, is frequently as poor as tens of meters.

Accordingly, there exists a need for estimating a vertical position or altitude of a communication device more accurately and independently of other measurements of position.

SUMMARY OF THE INVENTION

The present invention is a communication device and method for estimating a more accurate vertical position or altitude of a communication device using atmospheric pressure measurements. In one embodiment, the present invention is a first communication device comprising of a pressure sensor for measuring local atmospheric pressure at the first communication device and a transceiver for communicating with a second communication device, wherein the transceiver may be operable to receive barometric calibration information for calibrating a local atmospheric pressure measured at the first communication device and/or to transmit the measured local atmospheric pressure to the second communication device. The first communication device may further comprise a processor for estimating an altitude using the measured local atmospheric pressure and received barometric calibration information. The received barometric calibration information being transmitted to the communication device by the second (or a third) communication device which may be a part of a wireless communication network, such as a cellular network. The second communication device being operable to determine the barometric calibration information using a barometer or pressure sensor, to transmit the barometric calibration information in a manner indicating to the first communication device that the information being received is barometric calibration information, and/or to receive local atmospheric pressure measurements from the first communication device.

In another embodiment, the present invention is a method comprising the steps of measuring local atmospheric pressure using a pressure sensor at a communication device, and estimating an altitude of the communication device using the measured local barometric pressure and barometric calibration information corresponding to another atmospheric pressure measurement at a known elevation near the communication device.

BRIEF DESCRIPTION OF THE DRAWINGS

The features, aspects, and advantages of the present invention will become better understood with regard to the following description, appended claims, and accompanying drawings where

DETAILED DESCRIPTION

The present invention is a communication device and method for estimating a more accurate vertical position or altitude of a communication device using atmospheric pressure measurements. The present invention will be described herein with respect to determining altitude estimates for wireless communication devices in communication with a wireless communication network, such as a cellular network. It should be understood that the present invention is equally applicable to determining altitude estimates of wireless communication devices in communication with other wireless devices, and to determining altitude estimates of wired or optically linked communication devices. Furthermore, it should be understood that the term cellular network should not be limited to wireless communication network operating in the cellular frequency spectrum.

Figure 1:
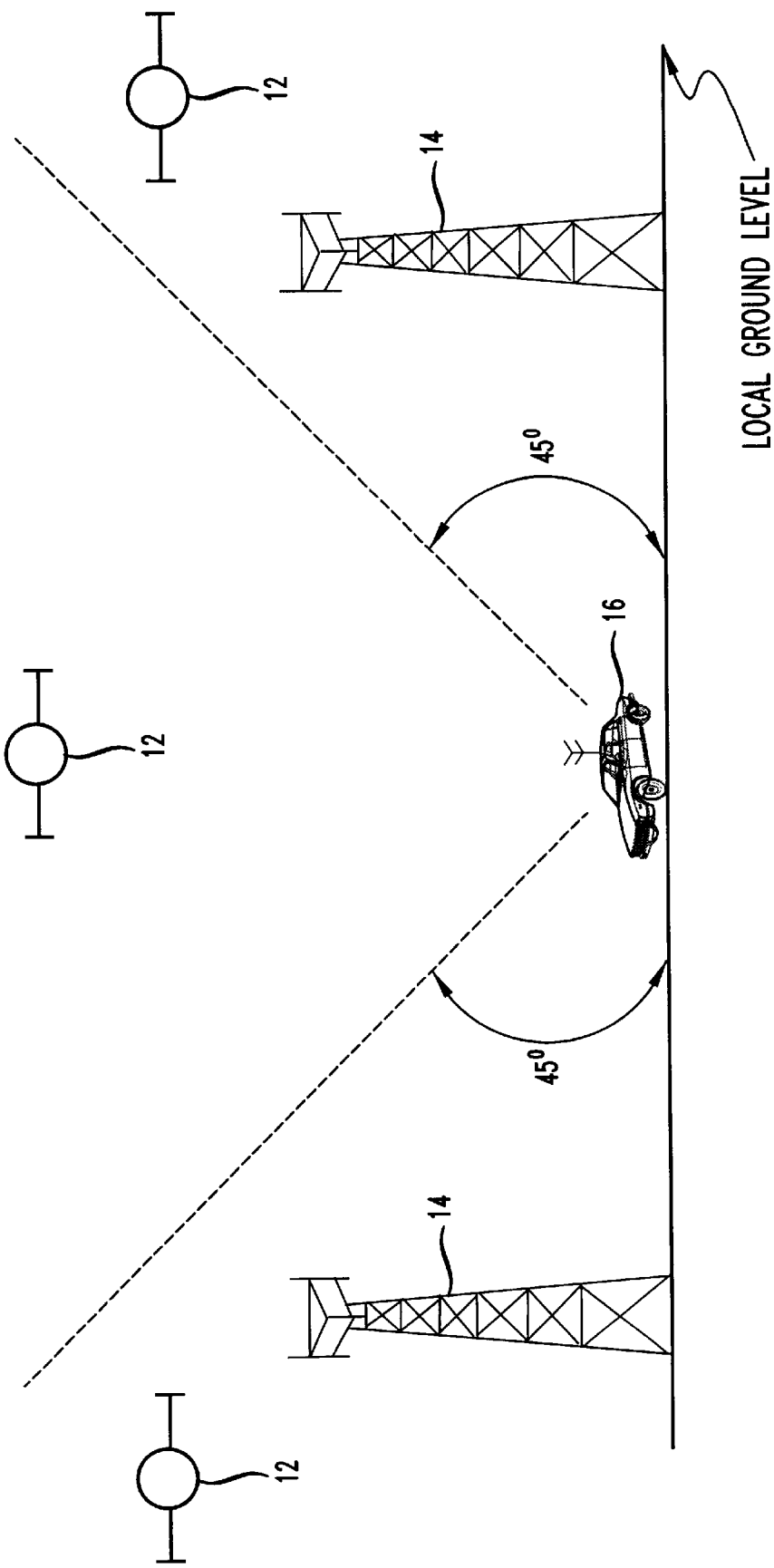
FIG. 1 depicts an architecture for locating a mobile-telephone using a plurality of GPS satellites comprising the GPS system and/or a plurality of base stations used in network-based solutions.
Figure 2:
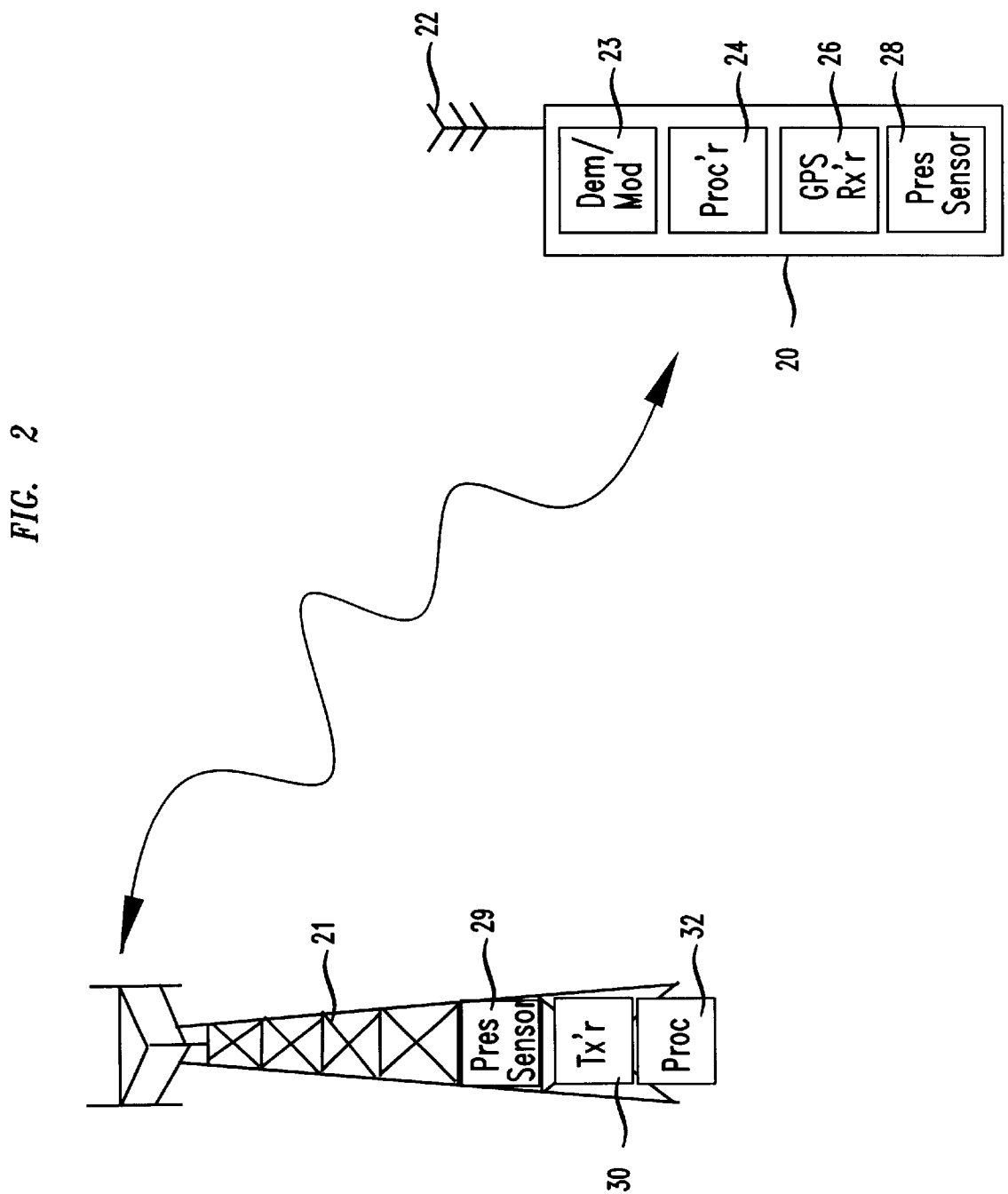
FIG. 2 depicts a mobile-telephone in communication with at least one base station in accordance with the present invention.

FIG. 2 depicts a mobile-telephone 20 in communication with at least one base station 21 in accordance with the present invention, wherein base station 21 is typically part of a wireless or cellular communication network. Mobile-telephone 20 comprises antenna 22 for receiving and transmitting signals, transceiver or transmitter/receiver 23 for demodulating and modulating signals, processor 24 for processing signals received by and to be transmitted by mobile-telephone 20, GPS receiver 26 for detecting GPS (or other geo-location) satellite signals, and pressure sensor 28. Antenna 22, transceiver 23 and GPS receiver 26 are well-known in the art. Processor 24 includes most or all processing capabilities in a typical mobile-telephone, as is well-known in the art, and processing capabilities with respect to determining location and calibrating atmospheric pressures measured by pressure sensor 28, as will be described herein.

Pressure sensor 28 is a device operable to measure atmospheric pressure which may be integrated into a silicon chip. See, for example, a handbook published by SenSym Inc. of 1804 McCarthy Blvd., Milpitas, Calif. "*Solid State Pressure Sensors Handbook*," (1995) pages iii–v. Pressure sensor 28 provides processor 24 with local atmospheric pressure measurements at mobile-telephone 20 which can be converted into an altitude estimate or vertical position of mobile-telephone 20. For example, airplanes commonly use pressure altimeters for estimating their altitude. The pressure altimeter determines altitude by measuring local air pressure and then converting the measurement into an altitude estimate through a well-known formula or standard pressure-altitude relationship (see the *Concise Encyclopedia of Science and Technology*, McGraw Hill, third edition (1994), Article: "Pressure Altimeter").

However, altitude estimates based only on local atmospheric pressure measurements obtained from local pressure sensor 28 are subject to inaccuracies because local atmospheric pressure may vary due to local weather conditions. Local variations in air pressure can be accounted for by using local barometric pressure measurements, wherein the term "barometric pressure" refers to an equivalent sea-level pressure or atmospheric pressure at a known elevation already calibrated to account for weather-induced variations in air pressure. The present invention accounts for variations in local barometric and/or atmospheric pressure due to local weather conditions using barometric calibration information to calibrate the local atmospheric pressures measured by pressure sensor 28.

Barometric calibration information includes data indicating an amount for calibrating or converting local atmospheric pressure measurements into a more accurate altitude estimate. Barometric calibration information being based on an atmospheric pressure measurement at a known altitude or elevation, e.g., sea level, near or in the general vicinity, e.g., within 10–20 miles, of mobile-telephone 20. A variety of manners may be used to determine barometric calibration information. One manner is to use base station 21 having barometer 29, which is a device that measures, at a given location, what the air pressure would be at that location at sea-level. Preferably, base station 21 is near mobile-telephone 20, e.g., primary base station or a base station in communication with mobile telephone 20, so that the barometer 29 experiences similar weather conditions as pressure sensor 28 at mobile-telephone 20 which would result in reliable barometric calibration information. Alternately, barometric calibration information can be derived from barometric pressure data readily provided by local weather service bureaus, or air traffic control centers or other equivalent services Another manner of determining barometric calibration information involves first determining a horizontal position of mobile-telephone 20. Based on the determined horizontal position, base station 21 may calculate, from a plurality of atmospheric pressure measurements at known elevations, an estimated atmospheric pressure nearest the determined horizontal position to use to determine the barometric calibration information.

In one embodiment of the present invention, mobile-telephone 20 receives the barometric calibration information via a downlink signal (i.e., signal transmitted from base station 21 via transmitter 30 to mobile-telephone 20) through a wireless link via antenna 22 (or wired or optical link if the communication device is not a wireless communication device). The barometric calibration information would be transmitted to mobile-telephone 20 in a manner or format which would indicate to mobile-telephone 20 that the information being received is barometric calibration information. For example, the barometric calibration information may include a unique identifier for identifying the barometric calibration information; the barometric calibration information may be preceded by a preamble or header (or succeeded by a trailer) indicating the barometric calibration information is to follow; or the barometric calibration information may be transmitted using a particular communication channel, Walsh code, frequency and/or time slot. Thus, base station 21 may also include a processor 32 for configuring or formatting the barometric calibration information such that the barometric calibration information is distinguishable from other information in the downlink signal. The barometric calibration information being modulated onto a carrier signal and transmitted by transceiver 30 as a downlink signal to mobile-telephone 20.

The barometric calibration information is demodulated from the downlink signal by transceiver 23 and provided to processor 26. Based on the configuration, formatting or manner in which the barometric calibration information was transmitted, processor 26 determines the downlink signal to include the barometric calibration information and uses the barometric calibration information to calibrate the local atmospheric pressure measurements provided by pressure sensor 28 before and/or after converting the local atmospheric pressure measurements into an altitude estimate. The altitude estimate may then be transmitted to base station 21.

In an alternate embodiment, the barometric calibration information is not transmitted to mobile-telephone 20 and mobile-telephone 20 may transmit its local atmospheric pressure measurements to base station 21 or another remote wireless communication device at a remote location having the barometric calibration information, wherein the local atmospheric pressure measurements may be transmitted using a particular communication channel, Walsh code, frequency and/or time slot and/or a particular format which would indicate the information being received is local atmospheric pressure measurements belonging to a particular mobile-telephone. In this embodiment, a server or processor at base station 21 or remote wireless communication device, such as a position determination entity (PDE), coverts the local atmospheric pressure measurements into an estimate of the mobile-telephone's altitude through the use of the barometric calibration information. The altitude estimate may then be transmitted back to mobile-telephone 20.

Mobile-telephone 20's altitude can also be estimated by GPS receiver 26 if enough signals, e.g., four, from different GPS satellites can be detected by GPS receiver 26, or if an appropriate combination of signals transmitted from different GPS satellites and from different land-based sources can be detected, e.g., two GPS satellite signals and two base station signals. The altitude estimate determined in one of these fashions can be provided to processor 28 and, perhaps, combined with the altitude estimate based on the local atmospheric pressure measurement of pressure sensor 28, to interpolate an even more reliable altitude estimate of mobile-telephone 20. For example, a weighing factor may be applied to the altitude estimate of GPS receiver 26 based on the number of signals detected from different GPS satellites or signal strength of detected GPS satellite signals, and a weighing factor may be applied to altitude estimate derived from the local atmospheric pressure measurements of pressure sensor 28 based on the distance between base station 21 and mobile-telephone 20. In another example, if GPS receiver 26 is able to determine an estimated error for its altitude estimate based on geometric dilution of precision (GDOP) and GPS satellite signal strength, such determination may be combined with an estimate of the error of pressure sensor 28, which may be provided by a manufacturer of mobile-telephone 20, to derive appropriate weighing factors. Such computations may be performed by mobile telephone 20, base station 21 or another entity, such as a PDE.

The altitude estimate can be combined with horizontal positions estimated by GPS receiver 26 or some network-based or other solution to provide a more precise location (longitude, latitude and altitude) of mobile-telephone 20.

The present invention is described herein with reference to certain embodiments. It should be understood that the present invention is also applicable to other embodiments including wired communication devices and networks. Accordingly, the present invention should not be limited to the embodiments disclosed herein.

We claim:

1. A communication device comprising:
   a pressure sensor for measuring local barometric pressure; and
   a transceiver for communicating with another communication device barometric calibration information based on atmospheric pressure measurements at a known elevation;
   wherein the communication device is a mobile-telephone, a base station belonging to a wireless communication network or a position determination entity.

2. The communication device of claim 1, wherein the transceiver receives the barometric calibration information from the other communication device for calibrating local barometric pressure measured by the pressure sensor.

3. The communication device of claim 1, wherein the pressure sensor is at the known elevation and the transceiver transmits to the other communication device the barometric calibration information based on local barometric pressure measured by the pressure sensor.

4. The communication device of claim 3, wherein the barometric calibration information is transmitted in a manner indicating to the other communication device barometric calibration information is being received.

5. The communication device of claim 3, wherein the barometric calibration information includes an identifier for identifying the barometric calibration information to another communication device.

6. The communication device of claim 3, wherein the barometric calibration information is preceded by a preamble or header for indicating that the barometric calibration information is to follow the preamble or header.

7. A communication device comprising:
   a pressure sensor for measuring local barometric pressure;
   a transceiver for communicating with another communication device, wherein the transceiver receives barometric pressure measurements from the other communication device; and
   a processor for determining an altitude of the other communication device based on the received barometric pressure measurements and local barometric pressure measurements by the pressure sensor, wherein the pressure sensor is at a known elevation;
   wherein the communication device is a mobile-telephone, a base station belonging to a wireless communication network or a position determination entity.

8. The communication device of claim 1 further comprising:
   a processor for estimating an altitude of the communication device based on received barometric calibration information from the other communication device and local barometric pressure measured by the pressure sensor.

9. The communication device of claim 8 further comprising:
   a GPS receiver for detecting GPS satellite signals and determining a location fix of the communication device, wherein the location fix indicates a horizontal plane position of the communication device.

10. The communication device of claim 9, wherein the location fix also indicates a vertical position of the communication device.

11. The communication device of claim 10, wherein the processor estimates an altitude of the communication device using the location fix and the local barometric pressure measurements.

12. The communication device of claim 1 further comprising:
    a GPS receiver for detecting GPS satellite signals and determining a location fix of the communication device, wherein the location fix indicates at least a horizontal plane position of the communication device.

13. The communication device of claim 12, wherein the location fix also indicates a vertical position of the communication device.

14. A communication device comprising:
    a pressure sensor for measuring local barometric pressure; and
    a transceiver for communicating with another communication device, wherein the transceiver transmits local barometric pressure measured by the pressure sensor to the other communication device, the other communication device being operable to calibrate the transmitted local barometric pressure measurements using barometric calibration information based on atmospheric pressure measurements at a known elevation;
    wherein the communication device is a mobile-telephone, a base station belonging to a wireless communication network or a position determination entity.

15. A method of determining an altitude position of a communication device comprising the steps of:
    measuring local barometric pressure at the communication device;
    receiving barometric calibration information from another communication device, the received barometric calibration information barometric being based on atmospheric pressure measurements at a known elevation; and
    determining the altitude position of the communication device using the measured local barometric pressure and the received barometric calibration information;
    wherein the communication device is a mobile-telephone.

16. The method of claim 15, wherein the barometric calibration information includes an identifier for identifying the barometric calibration information to the communication device.

17. The method of claim 15 comprising the additional step of:

prior to the step of receiving the barometric calibration information, receiving a preamble or header for indicating that the barometric calibration information is to be received next.

18. A method of assisting determination of an altitude of a communication device comprising the steps of:

transmitting barometric calibration information to the communication device in a manner indicating to the communication device that barometric calibration information was transmitted, wherein the barometric calibration information is based on a barometric pressure measurement near the communication device;

wherein the barometric calibration information is transmitted from a base station belonging to a wireless communication network or a position determination entity.

19. The method of claim 18 comprising the additional step of:

determining a location of the communication device prior to transmitting the barometric calibration information to the communication device.

20. The method of claim 19, wherein the location indicates a horizontal plane position of the communication device.

21. The method of claim 20, wherein the location of the communication device is determined using a network-based triangulation technique.

22. The method of claim 20, wherein the location is received from the communication device.

* * * * *